Figure 1:
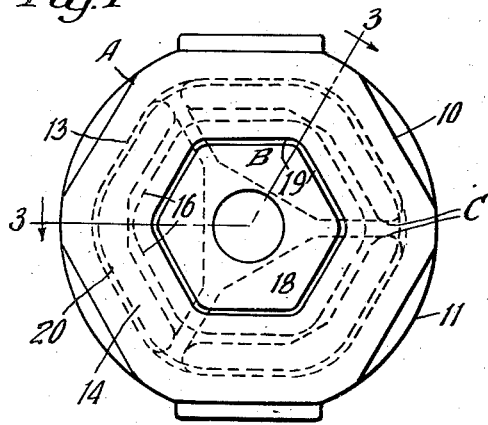

March 11, 1947.  G. E. DATH  2,417,154

FRICTION SHOCK ABSORBERS

Filed Oct. 18, 1943

Inventor
George E. Dath
By Henry Fuchs
Atty

Patented Mar. 11, 1947

2,417,154

UNITED STATES PATENT OFFICE 2,417,154

FRICTION SHOCK ABSORBER

George E. Dath, Chicago, Ill., assignor to W. H. Miner, Inc., Chicago, Ill., a corporation of Delaware Application October 18, 1943, Serial No. 506,627

2 Claims. (Cl. 213—24)

This invention relates to improvements in friction shock absorbers especially adapted for railway cars.

One object of the invention is to provide a friction shock absorber comprising a friction casing having a friction shell section at one end thereof and a cylindrical spring cage section rearwardly of the friction shell; a friction clutch within the friction shell section including a wedge and friction shoes, the wedge having shouldered engagement with the casing to limit outward movement of the wedge; a spring resistance within the spring cage section of the casing; and a circular closure closing the end of the spring cage, wherein the closure is provided with lugs engaging lugs on the casing to limit outward movement of the cap, and projecting into guideways on the interior of the casing, to hold the cap against rotary creeping movement with respect to the casing, thereby maintaining proper alignment of lugs of the cap and casing and preventing accidental separation of the parts.

Another object of the invention is to provide a friction shock absorber including a friction casing having a friction shell section at one end thereof and a spring cage section at the other end; a friction clutch slidingly telescoped within the friction shell section, including a wedge block and friction shoes, the wedge and shoes having wedging engagement with each other; and spring resistance means within the spring cage opposing inward movement of the shoes, wherein the wedge has shouldered engagement with a stop shoulder at the friction shell section end thereof to limit outward movement of the wedge, and the spring cage end of the casing is closed by a cap member which is applied after the clutch and spring resistance have been placed within the casing, and which is held assembled with the casing by interengaging means on said cap and casing including circumferentially spaced retaining lugs on the casing and aligned, cooperating, circumferentially spaced lugs on the cap, and ribs on the casing cooperating with the lugs of the cap to hold the cap against rotation with respect to the casing and maintain the aligned condition of the lugs.

A further object of the invention is to provide a shock absorber, as set forth in the preceding paragraph, wherein the parts are so proportioned and designed that the lugs of the cap will freely pass between the lugs of the casing to permit application of the cap by axial movement of the latter inwardly of the casing to position the lugs of the cap inwardly of the lugs of the casing and then turning the cap to bring the lugs in aligned cooperative relation.

Still another object of the invention is to provide a mechanism, as hereinbefore set forth, wherein the follower cap is movable with respect to the friction casing to provide for preliminary spring action.

Other objects of the invention will more clearly appear from the description and claims hereinafter following.

Figure 2:
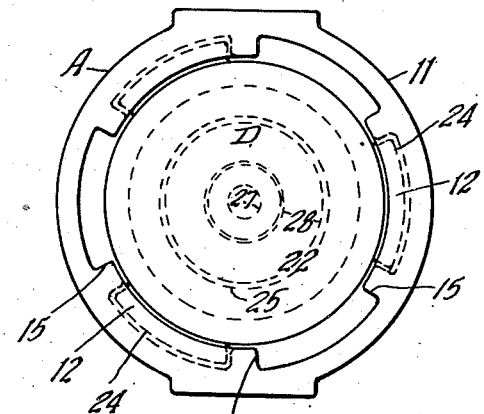
Figure 3:
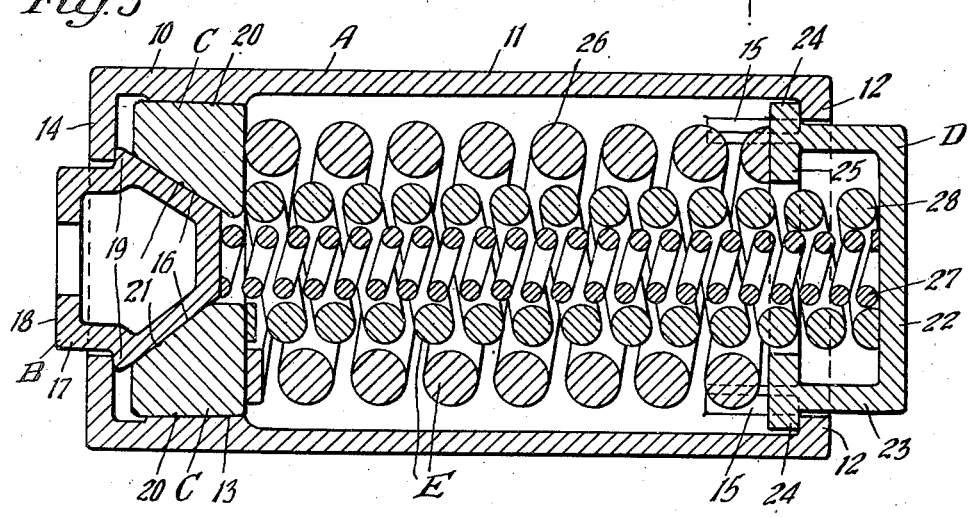

In the drawings forming a part of this specification, Figure 1 is a front end elevational view of a friction shock absorber embodying my invention. Figure 2 is a rear elevational view of said shock absorber. Figure 3 is a transverse, longitudinal, sectional view, corresponding substantially to the line 3—3 of Figure 1, said section being taken on two intersecting radial planes 120 degrees apart.

My improved shock absorber, as shown in the accompanying drawing, comprises broadly a friction casing A, a wedge block B; three friction shoes C—C—C; a preliminary spring cap D; and a spring resistance E.

The casing A is in the form of a tubular casting having a friction shell section 10 at the forward end and a spring cage section 11 rearwardly thereof. The spring cage section 11 is preferably of cylindrical cross section and has inturned, circumferentially spaced lugs or flanges 12 at the open rear end thereof. As shown in Figure 2, the lugs or flanges 12 are preferably three in number. The friction shell section of the casing is of hexagonal, transverse cross section, presenting six inwardly converging friction surfaces 13. As shown in Figure 3, the walls of the shell are thickened at the friction surfaces 13, said friction surfaces being spaced inwardly from the front end of the casing. At the forward end thereof, the friction shell section of the casing is provided with a continuous inturned stop flange 14.

Interiorly of the casing at the spring cage end 11 thereof are longitudinally extending short ribs 15—15. The ribs 15—15 are six in number, two such ribs being provided at each lug 12 of the casing. The ribs 15—15 associated with each lug are at opposite ends thereof and extend inwardly of the casing from said lug, thereby providing a guideway or pocket closed at the outer end by the lug 12.

The wedge B is in the form of a hollow block having three inwardly converging, flat wedge faces 16 at the inner end thereof arranged symmetrically about the longitudinal central axis of the mechanism. At the outer end, the wedge is reduced in size, said reduced portion being in the form of a hexagonal projection 17 extending through the opening defined by the flange 14 of the casing. The projection 17 protrudes from the casing, as shown in Figure 3, and has a flat, transverse, outer end face 18 adapted to receive the actuating force. The reduced portion of the wedge B provides lateral shoulders 19 at the inner end of the projection adapted to engage in back of the flange 14 of the casing to limit outward movement of the wedge.

The shoes C, which are three in number, are arranged between the wedge faces of the block B and the friction surfaces of the casing. Each shoe has an outer friction surface 20 of V-shaped, transverse cross section, cooperating with two adjacent friction surfaces 13—13 of the friction shell section 10 of the casing. Each shoe has a wedge face 21, correspondingly inclined to and engaging one of the wedge faces 16 of the wedge. At the rear end, each shoe has a flat, transverse face forming an abutment for the spring resistance E.

The spring cap D is of cup-shaped form having a transverse end wall 22 and a cylindrical side wall 23. At the inner end, the side wall 23 is provided with three circumferentially spaced, radial flanges or lugs 24, and an inturned, circular flange 25 in transverse alignment with the lugs forming an abutment for the outer coil of the spring resistance E. The spring cap D extends through the opening between the flanges or lugs 12—12—12 of the casing A and has the radial lugs 24—24—24 thereof aligned with the lugs 12—12—12 and guided between the ribs 15—15 associated with the corresponding lugs 12. In the normal position of the parts, the lugs 24—24—24 engage the lugs 12—12—12, thereby limiting outward movement of the cap.

The spring resistance E preferably comprises three coils, a relatively heavy outer coil 26 having its opposite ends bearing respectively on the flange 25 of the spring cap and inner ends of the shoes C, a central coil 27 having its front end bearing on the inner end of the wedge B, and a coil 28 between the coils 27 and 26, that is, surrounding the central coil 27, bearing at its front end on the shoes C—C—C. The rear end portions of the coils 27 and 28 extend through the opening defined by the inturned flange 25 of the cap D and bear on the end wall 22 of the latter. The springs 26, 27, and 28 are under initial compression and thus hold the lugs 24 of the cap seated against the lugs 12 of the casing A. The lugs 24 of the cap are of such a width that they will freely pass between adjacent lugs 12 of the casing when the cap is properly adjusted.

In assembling the mechanism, the wedge B, shoes C—C—C, and spring E are inserted within the casing A, through the open rear end thereof. The front end of the friction casing is buttressed against a support with the wedge free so that it remains in the projected position shown in Figure 3. The spring cap D is then applied, the same being first axially aligned with the casing and turned to a position with the lugs 24—24—24 thereof aligned with the spaces between the lugs 12—12—12. While in this position the cap is pushed into the casing against the resistance of the springs 26, 27, and 28 until the lugs 24—24—24 of the spring cap clear the inner ends of the guide ribs 15—15. The cap is then turned about its axis until the three lugs thereof are aligned with the lugs of the casing. The pressure is then removed from the cap, permitting the springs to project the cap outwardly, thereby entering the lugs in the guideways between the ribs 15—15 and forcing the same against the lugs of the casing. The cap is thus operatively connected to the casing and has its outward movement limited by the lugs of the latter. Inasmuch as the ribs hold the cap against rotation with respect to the casing, there is no danger of the same becoming accidentally disengaged therefrom. In this connection, it is pointed out that the length of the ribs 15—15 is such that the lugs of the cap will remain engaged therewith during full inward movement of the cap during operation of the mechanism, that is, when the cap is pushed inwardly to an extent that the rear end thereof is in alignment with the rear end of the casing A.

As is well known to those skilled in this art, my improved shock absorber is mounted on the railway car between the usual front and rear followers and is compressed therebetween during both draft and buffing actions. In the operation of my improved mechanism as the same is being compressed, the preliminary follower cap is first forced inwardly against the spring resistance, the friction existing between the friction shoes and the casing being too great to permit inward movement of the clutch, which includes the wedge, until the spring cap D has been forced inwardly to the full extent of its movement and the cooperating follower of the draft rigging engages the rear end of the casing A. After the casing is engaged by the follower, the wedge is compelled to move inwardly, spreading the shoes apart and forcing the same inwardly along the friction surfaces of the friction shell section of the casing with resultant high frictional resistance.

When the actuating pressure is reduced, the parts are all returned to the normal full release position shown in Figure 3 by the expansive action of the spring resistance, outward movement of the wedge B being limited by the stop flange 14 of the casing being engaged by the shoulders 19—19 of the wedge, and outward movement of the spring cap being limited by engagement of the lugs 24—24 thereof with the lugs 12—12 of the casing.

I claim:

1. In a shock absorber, the combination with a casing having a friction shell section at one end and a spring cage section at the other end; of a friction clutch slidingly telescoped within the friction shell section of the casing, said clutch including a wedge having shouldered engagement with the casing to limit outward movement of the former; a cup-shaped cap closing the spring cage end of the casing, said cap being telescoped within said spring cage end of the casing, said cap normally projecting outwardly beyond the spring cage end of the casing and being displaceable inwardly flush with the rear end of said casing in service, and further displaceable inwardly beyond the spring cage end of the casing when the mechanism is being assembled, said casing having circumferentially spaced, longitudinally extending guide channels at the rear end of the spring cage section, and inwardly extending, circumferentially spaced stop flanges closing the rear ends of said respective guide channels; and spring means within the casing bearing at its front and rear ends on said clutch and cap, respectively, said cap having laterally projecting, circumferentially spaced guide lugs at its inner end, corresponding in number to the guide channels of said casing, said guide lugs of the cap being of a size to pass freely through the spaces between said guide channels when said cap is turned to align said lugs with said spaces, said cap, in the assembled condition of the cap and casing, being telescoped within the casing with the lugs of the cap engaged with and guided by said channels to hold said cap against rotation with respect to the casing with the lugs thereof aligned with the stop flanges of the casing, said cap having its outward movement with respect to the casing limited by engagement of said lugs with said flanges, said guide channels being of a length to retain said guide lugs of the cap therein when the cap is in position with its rear extremity flush with the rear end of the spring cage section of the casing, said cap, in assembling the same with the casing, being displaceable inwardly to an extent to bring the lugs to a position inwardly beyond and clear of the inner ends of said channels to permit rotation of the cap to align the lugs thereof with said channels.

2. In a shock absorber, the combination with a tubular casing having interior friction surfaces at one end thereof; of a cup-shaped spring cap telescoped within the other end of the casing; a friction clutch slidably engaged with the friction surfaces of the casing; springs interposed and reacting between the clutch and spring cap; lengthwise extending, circumferentially spaced, interior guide ribs at the second named end of the casing, said ribs being arranged in spaced pairs, the ribs of each pair providing a lengthwise extending guide channel therebetween; inwardly projecting, circumferentially spaced stop flanges at the extremity of said second named end of the casing, said flanges corresponding in number to the guide channels and each flange closing the outer end of one of said channels; and circumferentially spaced, laterally projecting guide flanges at the inner end of said cap, said guide flanges corresponding in number to said guide channels, said guide flanges being respectively engaged within said guide channels to hold said cap against rotation with respect to the casing, said guide flanges being engageable with said stop flanges to limit outward movement of the cap, said ribs being of a length to confine said guide flanges therebetween and hold the cap against rotation when said cap is displaced inwardly of the casing flush with the second named end thereof, said cap being displaceable lengthwise of the casing inwardly beyond said second named end thereof to an extent to bring said guide flanges inwardly beyond the inner ends of said ribs and clear of the guide channels to permit turning of the cap to position said guide flanges in alignment with the spaces between said pairs of ribs to allow withdrawal of said cap from the casing.

GEORGE E. DATH.

REFERENCES CITED

The following references are of record in the file of this patent:

UNITED STATES PATENTS

| Number | Name | Date |
| --- | --- | --- |
| 1,303,288 | Geiger | May 13, 1919 |
| 1,307,313 | O'Connor | June 17, 1919 |
| 2,050,541 | Olander | Aug. 11, 1936 |
| 2,289,348 | Dath | July 14, 1942 |
| 2,335,847 | Dath | Dec. 7, 1943 |
| 1,730,223 | Lounsbury | Oct. 1, 1929 |
| 1,507,230 | Claflin | Sept. 2, 1924 |

FOREIGN PATENTS

| Number | Country | Date |
| --- | --- | --- |
| 41,469 | Swiss | Aug. 26, 1927 |